United States Patent
Schachtl et al.

(10) Patent No.: US 7,677,376 B2
(45) Date of Patent: Mar. 16, 2010

(54) ELECTROMAGNETIC FRICTION ENGAGED CLUTCH, METHOD FOR THE OPERATION THEREOF, AND USE THEREOF IN A DRIVE TRAIN FOR AUTOMATICALLY ACTUATING A VEHICLE DOOR OR A VEHICLE FLAP

(75) Inventors: Stephan Schachtl, Creitel Cedex (FR); Andreas Winter, Creitel Cedex (FR); Thomas Humez, Creitel Cedex (FR); Andreas Berger, Creitel Cedex (FR)

(73) Assignee: Valeo Sicherheitssysteme GmbH, Erdweg (DE)

( * ) Notice: Subject to any disclaimer, the term of this patent is extended or adjusted under 35 U.S.C. 154(b) by 457 days.

(21) Appl. No.: 11/660,114

(22) PCT Filed: Aug. 5, 2005

(86) PCT No.: PCT/EP2005/053864
§ 371 (c)(1),
(2), (4) Date: Feb. 12, 2007

(87) PCT Pub. No.: WO2006/018398
PCT Pub. Date: Feb. 23, 2006

(65) Prior Publication Data
US 2007/0246322 A1    Oct. 25, 2007

(30) Foreign Application Priority Data
Aug. 13, 2004 (DE) .................. 10 2004 039 264

(51) Int. Cl.
F16D 19/00 (2006.01)
F16D 27/00 (2006.01)
F16D 37/02 (2006.01)

(52) U.S. Cl. .................. 192/84.31; 192/84.93
(58) Field of Classification Search .......... 192/84.31, 192/84.93, 84.94
See application file for complete search history.

(56) References Cited

U.S. PATENT DOCUMENTS
2004/0245064 A1 * 12/2004 Schachtl et al. ........ 192/84.961

FOREIGN PATENT DOCUMENTS
| DE | 199 20 543 | 12/2000 |
| DE | 103 24 487 | 12/2004 |
| WO | WO-03/104671 | 12/2003 |

OTHER PUBLICATIONS
Translation of DE 19920543.*
International Search Report for PCT/EP2005/053864 mailed Jan. 3, 2006 (2 pages).

* cited by examiner

Primary Examiner—Tisha D Lewis
(74) Attorney, Agent, or Firm—Osha • Liang LLP

(57) ABSTRACT

An electromagnetic frictionally engaged clutch provided with a rotor part including a friction lining. An electrical coil and a first permanent magnet are arranged on the rotor part. The clutch also includes an armature disk which is connected to a second shaft and can be displaced in a rotationally fixed manner, but axially from a coupled end position to an uncoupled end position. The coil of the clutch is enabled to be current-free both in the coupled state and in the uncoupled state. To this end, a second permanent magnet is provided for exerting an axial force opposing the magnetic force of the first permanent magnet on the armature disk.

4 Claims, 2 Drawing Sheets

ELECTROMAGNETIC FRICTION ENGAGED CLUTCH, METHOD FOR THE OPERATION THEREOF, AND USE THEREOF IN A DRIVE TRAIN FOR AUTOMATICALLY ACTUATING A VEHICLE DOOR OR A VEHICLE FLAP

FIELD OF THE INVENTION

The invention relates to an electromagnetic frictionally engaged clutch, a method for operating it and a use of the clutch within a drive train for automatically activating a vehicle door or vehicle flap (tailgate, hood, etc.).

BACKGROUND

Such known clutches have both a rotor part which is provided with a friction lining and a rotor part which is connected in a rotationally fixed fashion to a first shaft and on which an electric coil is arranged on the side facing away from the friction lining, and an armature plate which is connected in a rotationally fixed but axially moveable fashion to a second shaft. In this context, in the engaged state a torque which is dependent on the coil current is transmitted from the first shaft to the second shaft. Therefore, if it is desired to maintain the force flux between the shafts, current has to flow constantly through the coil of the clutch.

DE 102 25 580 A1 discloses an electromagnetic clutch for use within a drive train for automatically activating the tailgate of a motor vehicle on whose rotor part a permanent magnet is arranged. This ensures that the tailgate of the motor vehicle is held securely in each intermediate position when the coil is currentless. However, in this clutch a current must flow through the coil continuously in order to disconnect the clutch. Essentially force-free emergency activation of the corresponding tailgate is therefore not possible.

SUMMARY OF THE INVENTION

The invention is based on the object of specifying an electromagnetic frictionally engaged clutch whose coil can be current free both in the engaged state and in the disengaged state. In addition, a method for operating such a (bistable) clutch and a preferred use of the clutch within a drive train for automatically activating a vehicle door or vehicle flap (tailgate, engine hood, etc.) are specified.

This object is achieved according to the invention in terms of the clutch by the features of claim 1, in terms of the method by the features of claim 7, and in terms of the use by the features of claim 8. Further, particularly advantageous refinements of the invention are disclosed by the subclaims.

The invention is based essentially on the idea of, on the one hand, arranging a first permanent magnet on the rotor part as in DE 102 25 580 A1, and, on the other hand, providing means which exert on the armature plate an axial force which is opposed to the magnetic force of the first permanent magnet. In this context, the first permanent magnet and the means are selected such that the resulting force which is exerted on the armature plate by the permanent magnet and the means presses the armature plate against the friction lining of the rotor part when the coil is not energized if the armature plate is in its engaged end position, and presses the armature plate against a stop which is spaced axially apart from the friction lining of the rotor part if it is in its disengaged end position. Currents can be applied to the electric coil in such a way that the magnetic field which is generated thereby moves the armature plate into its engaged end position or its disengaged end position as a function of the direction of the current, counter to the restoring force of the means or of the first permanent magnet.

The clutch according to the invention therefore has the advantage that it has two stable currentless states, with the switching over between the two stable states respectively taking place merely as a result of a current pulse which has corresponding magnitude, duration and direction and is applied to the coil.

The means which exert on the armature plate an axial force which is opposed to the magnetic force of the first permanent magnet can be at least one elastic element which is arranged between the armature plate and the rotor or else at least one second permanent magnet which is arranged between the armature plate and the stop.

It is possible to use, for example, pressure springs, disk springs, corrugated washers or rubber buffers as elastic elements.

The clutch according to the invention can advantageously be arranged within a drive train which connects a drive motor and a vehicle door or a vehicle flap, in which case, when the electric coil is not energized, the armature plate which is in its engaged end position is pressed, by virtue of the permanent magnet, against the friction lining of the rotor part with a force which is large enough to ensure that the vehicle door or vehicle flap remains securely in the respective position assumed when the clutch is switched off.

With the clutch according to the invention it is also easily possible to predefine a "transmission torque curve" by predefining a corresponding voltage profile or current profile, i.e. the clutch can implement different transmission torques in different positions of the vehicle door.

BRIEF DESCRIPTION OF THE DRAWINGS

Further details and advantages of the invention emerge from the following exemplary embodiments which are explained with reference to figures, in which.

DETAILED DESCRIPTION

Figure 1:
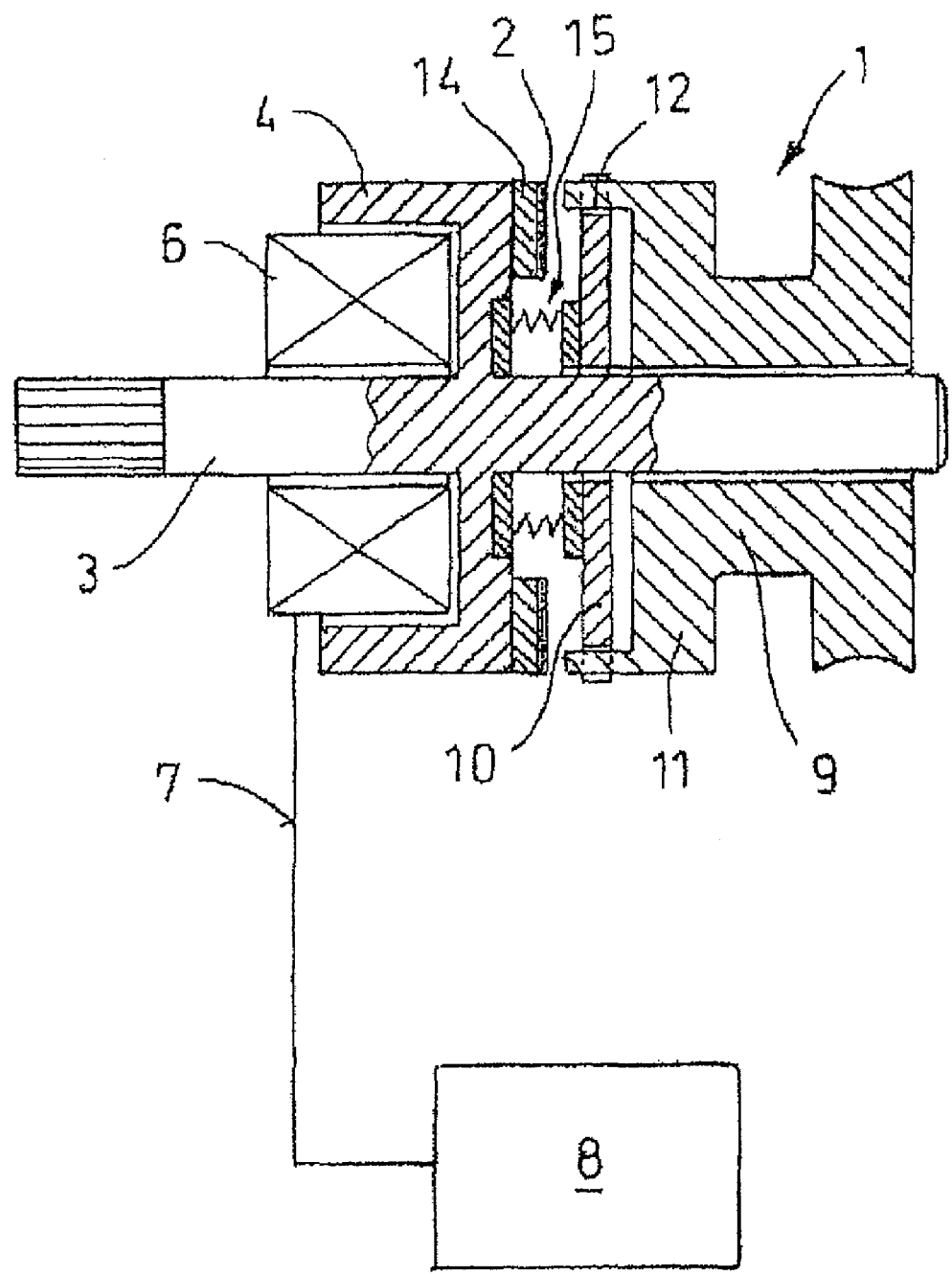
FIG. 1 shows a schematic, sectional side view of a clutch according to the invention with spring elastic means which are arranged between the armature plate and the rotor.
Figure 2:
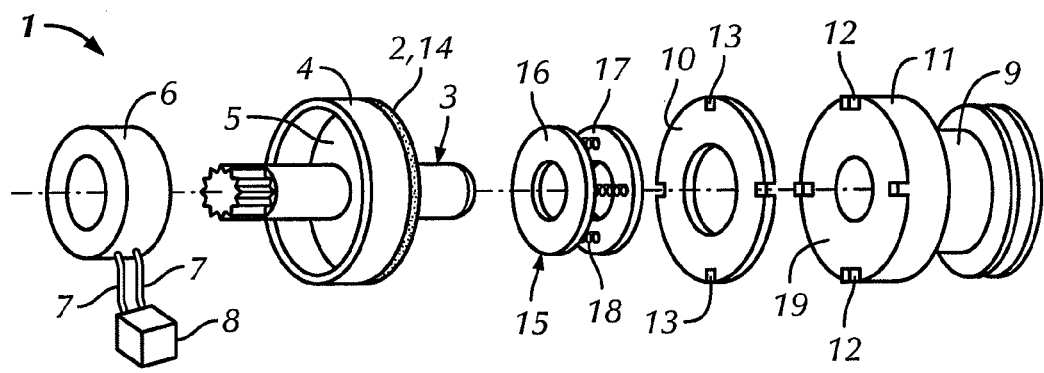
FIG. 2 is an exploded view of the clutch represented in FIG. 1, the integer parts of the clutch being illustrated in perspective.

In FIGS. 1 and 2, an electromagnetic frictionally engaged clutch (illustrated only schematically and without a housing) is referred to by 1, it being possible to arrange said clutch, for example, within a drive train between a drive motor (not illustrated) and a tailgate (likewise not illustrated) of a motor vehicle.

The clutch 1 comprises a rotor part 4 which is provided with a friction lining 2, is connected in a rotationally fixed fashion to a first shaft 3 (for example the drive shaft which is connected to the drive motor) and has, on a side facing away from the friction lining 2, a recess 5 in which an electric coil 6 is mounted fixed to the housing. The coil 6 is connected via electric lines 7 to an electric control device 8.

The clutch 1 also has an armature plate 10 which is connected to a second shaft 9 (output shaft) in a rotationally fixed but axially displaceable fashion. For this purpose, the second shaft 9 is fixedly connected to an armature plate carrier 11 which comprises axial guide parts 12 which engage in corresponding, groove-shaped recesses 13 in the armature plate 10.

An annular, first permanent magnet 14 on which the friction lining 2 is mounted in the illustrated exemplary embodiment is arranged on the rotor part 4, parallel to the electric coil 6.

In addition, a spring elastic element 15 is arranged between the armature plate 10 and the rotor part 4, said spring elastic element exerting, on the armature plate 10, an axial force which is opposed to the magnetic force of the first permanent magnet 14. In this context, the spring elastic element 15 is composed of two annular end parts 16, 17 and a plurality of spring elements 18 which are located between the end parts 16, 17. The first annular end part 16 is supported on the rotor part 4, and the second annular end part 17 is supported on the armature plate 10.

The first permanent magnet 14 and the spring elastic element 15 as well as the displacement path of the armature plate 10 along the guide parts 12 of the armature plate carrier 11 are selected such that the resulting force which is exerted on the armature plate 10 by the first permanent magnet 14 and the spring elastic element 15 presses the armature plate 10 against the friction lining 2 of the rotor part 4 when the coil 6 is not energized and the armature plate 10 is in its engaged end position, i.e. that is against the friction lining 2. In this position, the forces which are exerted on the armature plate 10 by the spring elements 18 are therefore substantially smaller than the magnetic force of the first permanent magnet 14 acting on the armature plate 10.

In contrast, if the armature plate 10 is in its disengaged position—i.e. against the stop formed by the front side 19 of the armature plate carrier 11—when the coil 6 is not energized, the armature plate 10 is pressed against the stop 19 by the spring elastic element 15 since the spring forces in this case are larger than the magnetic force of the first permanent magnet 14 acting on the armature plate 10.

The armature plate 10 is moved into its engaged position or disengaged position by means of the magnetic field which is brought about by the electric coil 6, the control device 8 only generating a relatively short current pulse in each case. As a result, when the clutch 1 is disengaged, a first current pulse is applied to the electric coil 6 to engage the clutch 1, said current pulse giving rise to a magnetic field which is in the same direction as the magnetic field of the first permanent magnet 14 and moves the armature plate 10 into its disengaged position counter to the force of the spring elastic element 15. When the clutch 1 is engaged, a second current pulse is applied to the electric coil 6 in order to disengage the clutch 1, said current pulse generating a magnetic field which is in the opposite direction to the magnetic field of the first permanent magnet 14 and moves the armature plate 10 into its disengaged end position counter to the force of the first permanent magnet 14.

When the clutch 1 is used in an arrangement within a drive train for automatically activating the tailgate of a motor vehicle (cf. for example also the document DE 102 25 580 A1 mentioned at the beginning), the tailgate can then be pivoted essentially in a force-free fashion in the disengaged state of the clutch. By generating short current pulses by means of the control device 8 it is possible to secure the tailgate in different positions without a further current having to flow after these positions have been reached. In this context, the magnitude of the magnetic force of the first permanent magnet 14 has to be selected such that, when the electric coil 6 is not energized, the armature plate 10 which is in its engaged end position is pressed against the friction lining 2 of the rotor part 4 with a force which is large enough for the vehicle door or vehicle flap to remain securely in the respective position assumed when the clutch 1 is switched off.

If the clutch 1 is in its engaged position, the correspondingly high, continuously flowing current can be sent through the coil 6 by means of the control device 8 in order to increase the torque to be transmitted.

The invention is of course not restricted to the exemplary embodiment described above. The function of the spring elastic element can, for example, also be carried out by a second permanent magnet which is arranged between the armature plate and the stop provided that its attraction force on the armature plate is greater than the attraction force of the first permanent magnet when the armature plate is in its disengaged position.

Figure 3:
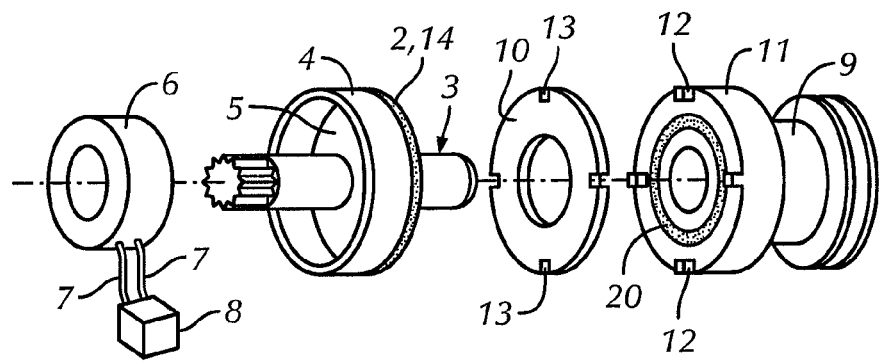
FIG. 3 shows a further exemplary embodiment, corresponding to FIG. 2, of a clutch according to the invention, a second permanent magnet being provided on the side of the armature plate facing away from the rotor.

A corresponding exemplary embodiment of such a clutch is illustrated in FIG. 2. Here, the same parts as in FIG. 3 are characterized by the same reference symbols. The second permanent magnet which is embodied in an annular shape is provided with the reference symbol 20.

LIST OF REFERENCE NUMERALS

1 Clutch
2 Friction lining
3 First shaft
4 Rotor part
5 Recess
6 Electric coil, coil
7 Electric line
8 Control device
9 Second shaft
10 Armature plate
11 Armature plate carrier
12 Guide part
13 Groove-shaped recess
14 First permanent magnet
15 Spring elastic element, elastic element, means
16, 17 End parts
18 Spring element
19 Front side, stop
20 Second permanent magnet, means

The invention claimed is:
1. An electromagnetic frictionally engaged clutch having the features:
   a) the clutch comprises a rotor part which is provided with a friction lining and is connected in a rotationally fixed fashion to a first shaft and on which an electric coil is arranged, as well as an armature plate which can be moved in a rotationally fixed fashion but axially movable from an engaged end position into a disengaged end position and is connected to a second shaft;
   b) a first permanent magnet is arranged on the rotor part;
   c) the clutch comprises at least one second permanent magnet which is arranged between the armature plate and a stop, wherein the at least one second permanent magnet exerts an axial force on the armature plate which is opposed to the magnetic force of the first permanent magnet;
   d) the first permanent magnet and the at least one second permanent magnet are selected such that the resulting force is exerted on the armature plate by the first permanent magnet and the at least one second permanent magnet forces the armature plate against the friction lining of the rotor part when the coil is not energized if the armature plate is in its engaged end position and the armature plate is forced against the stop which is spaced apart axially from the friction lining of the rotor part if it is in its disengaged end position, and e) currents can be applied to the electric coil in such a way that the magnetic field generated thereby moves the armature plate into its engaged end position or its disengaged end position as a function of the direction of the current.

2. The clutch as claimed in claim 1, wherein the second shaft is connected on the outside in a rotationally fixed fashion to an armature plate carrier which comprises axial guide parts which engage in corresponding, groove-shaped recesses in the armature plate.

3. The clutch as claimed in claim 1, wherein the rotor part has, on its side facing away from the friction lining, a recess in which the coil is at least partially arranged.

4. The clutch as claimed in claim 2, wherein the rotor part has, on its side facing away from the friction lining, a recess in which the coil is at least partially arranged.

* * * * *